United States Patent
Shao et al.

(10) Patent No.: US 12,462,890 B2
(45) Date of Patent: Nov. 4, 2025

(54) METHOD FOR OPERATING A MEMORY DEVICE AND MEMORY DEVICE THEREOF

(71) Applicant: PUFsecurity CORPORATION, Hsinchu County (TW)

(72) Inventors: Chi-Yi Shao, Hsinchu County (TW); Chia-Cho Wu, Hsinchu County (TW)

(73) Assignee: PUFSECURITY CORPORATION, Hsinchu County (TW)

(*) Notice: Subject to any disclaimer, the term of this patent is extended or adjusted under 35 U.S.C. 154(b) by 363 days.

(21) Appl. No.: 18/360,530

(22) Filed: Jul. 27, 2023

(65) Prior Publication Data

US 2024/0170086 A1 May 23, 2024

Related U.S. Application Data

(60) Provisional application No. 63/426,369, filed on Nov. 18, 2022.

(51) Int. Cl.
- G11C 17/16 (2006.01)
- G11C 29/10 (2006.01)
- G11C 29/18 (2006.01)

(52) U.S. Cl.
CPC .............. G11C 29/18 (2013.01); G11C 29/10 (2013.01); G11C 2029/1806 (2013.01)

(58) Field of Classification Search
CPC .... G11C 17/14–18; G11C 29/18; G11C 29/10
See application file for complete search history.

(56) References Cited

U.S. PATENT DOCUMENTS

| | | |
|---|---|---|
| 7,187,603 B2 | 3/2007 | Nagata et al. |
| 8,913,449 B2 | 12/2014 | Chung et al. |
| 9,047,991 B2 | 6/2015 | Houg et al. |
| 9,129,712 B2 | 9/2015 | Ong et al. |
| 2007/0283084 A1 | 12/2007 | Chiu et al. |

FOREIGN PATENT DOCUMENTS

TW          200744099 A       12/2007

OTHER PUBLICATIONS

Office Action issued by TIPO dated Aug. 6, 2024 for TW11320801610.
English translation of the Search Report appended to Office Action issued by TIPO dated Aug. 6, 2024 for TW11320801610.
English Summary of Office Action issued by TIPO dated Aug. 6, 2024 for TW11320801610.

*Primary Examiner* — Alfredo Bermudez Lozada
(74) *Attorney, Agent, or Firm* — WPAT, P.C.; Anthony King

(57) ABSTRACT

The present application discloses a method for operating a memory device. The memory device includes a plurality of rows of repair one-time programmable (OTP) cells and a plurality of rows of main OTP cells. The method includes performing a testing procedure to determine validities of the plurality of rows of repair OTP cells and store repair information to a first part of rows of repair OTP cells that are determined to be valid, and performing a repairing procedure to determine validities of the plurality of rows of repair OTP cells and repair at least one row of main OTP cells that is determined to be invalid in the plurality of rows of main OTP by using a second part of the rows of repair OTP cells that are determined to be valid.

20 Claims, 6 Drawing Sheets

METHOD FOR OPERATING A MEMORY DEVICE AND MEMORY DEVICE THEREOF

CROSS REFERENCE

This application claims the benefit of prior-filed U.S. provisional application No. 63/426,369, filed on Nov. 18, 2022, which is incorporated by reference in its entirety.

TECHNICAL FIELD

The present disclosure relates to a memory device, and more particularly, to a memory device capable of performing a testing procedure and a repairing procedure to improve yield rate.

DISCUSSION OF THE BACKGROUND

One-time programmable (OTP) memory is a type of non-volatile memory that can only be programmed once. That is, after the OTP cell is programmed, the storage state of the OTP cell is permanently determined and cannot be modified or erased. Such unique feature provides a high level of data security, making it an ideal choice for storing sensitive information such as encryption keys, device identifiers, or firmware. However, the inability to change the programmed state also make it less versatile.

During the manufacturing process, defects may occur to some of OTP cells, and such defects may change the storage state of the OTP cells to be a programmed state. Since the storage state of the OTP cells cannot be changed after being programmed, such OTP cells would be reported as failed cells or invalid cells. In prior art, to repair these invalid OTP cells, memory devices may provide redundant blocks of OTP cells for replacement. However, the OTP cells in the redundant blocks may also turn out to be invalid. Therefore, it is difficult to repair the invalid OTP cells effectively.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method for operating a memory device. The memory device includes a memory, and the memory array includes a plurality of rows of repair one-time programmable (OTP) cells and a plurality of rows of main OTP cells. The method includes performing a testing procedure to determine validities of the plurality of rows of repair OTP cells and store repair information to a first part of rows of repair OTP cells that are determined to be valid, and performing a repairing procedure to determine validities of the plurality of rows of repair OTP cells and repair at least one row of main OTP cells that is determined to be invalid in the plurality of rows of main OTP by using a second part of the rows of repair OTP cells that are determined to be valid.

Another aspect of the present disclosure provides a memory device. The memory device includes a memory array and a controller. The memory array includes a plurality of rows of main OTP cells and a plurality of rows of repair OTP cells. The plurality of rows of main OTP cells are configured to store data. The controller is configured to perform a testing procedure to determine validities of the plurality of rows of repair OTP cells and store repair information to a first part of rows of repair OTP cells that are determined to be valid, and perform a repairing procedure to determine validities of the plurality of rows of repair OTP cells and repair at least one row of main OTP cells that is determined to be invalid in the plurality of rows of main OTP by using a second part of the rows of repair OTP cells that are determined to be valid.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures.

FIG. 3 shows rows of repair OTP cells after the testing procedure is performed according to one embodiment of the present disclosure.

FIG. 4 shows rows of main OTP cells and rows of repair OTP cells after the repairing procedure is performed according to one embodiment of the present disclosure.

FIG. 5 shows rows of main OTP and rows of repair OTP cells after the securing procedure is performed according to one embodiment of the present disclosure.

DETAILED DESCRIPTION

Figure 1:
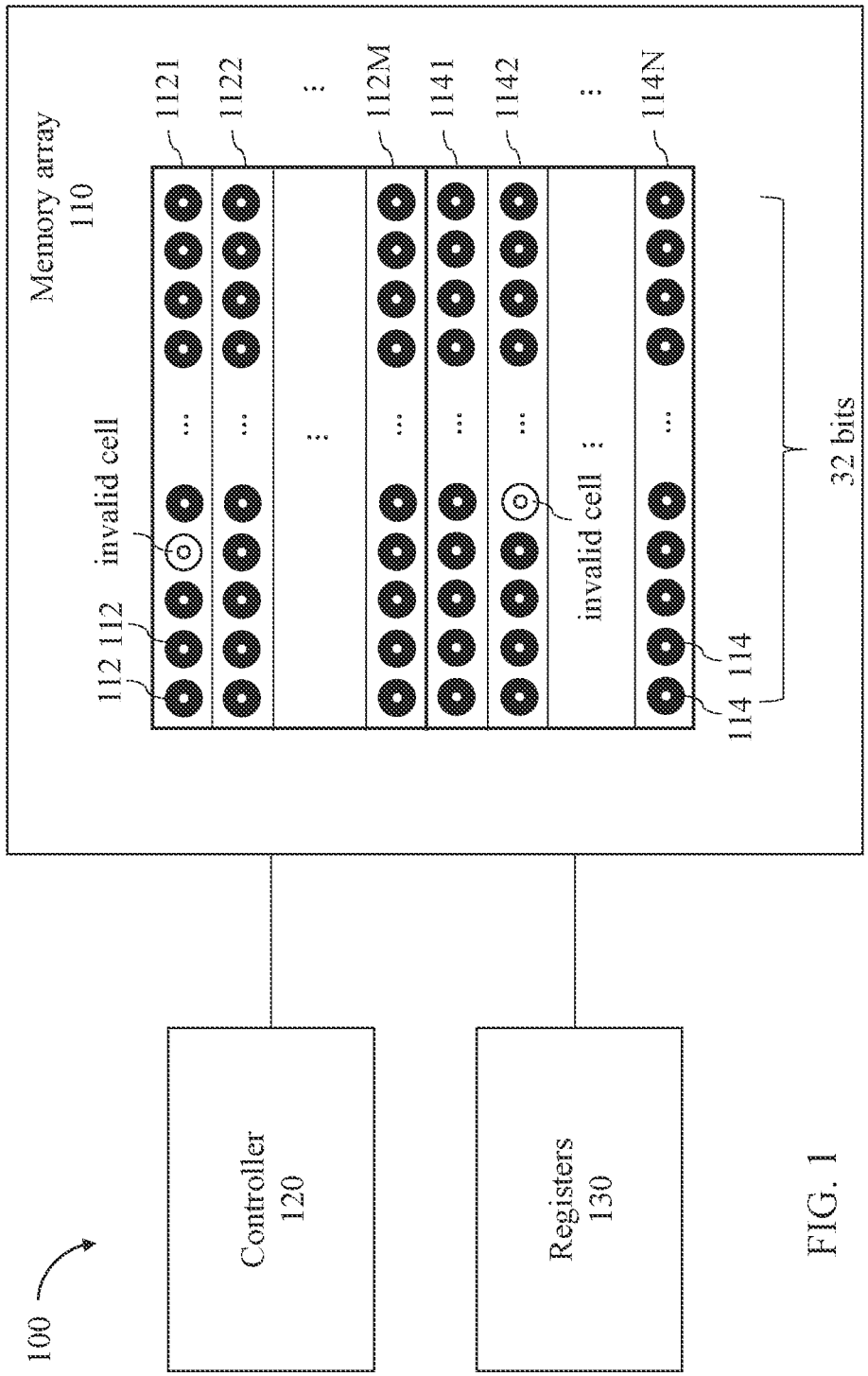
FIG. 1 shows a memory device according to one embodiment of the present disclosure.

FIG. 1 shows a memory device 100 according to one embodiment of the present disclosure. The memory device 100 includes a memory array 110. The memory array 110 includes M rows of main one-time programmable (OTP) cells 1121 to 112M, and N rows of repair OTP cells 1141 to 114N, where M and N are integers greater than 1, and M is greater than N.

In the present embodiment, each row of main OTP cells 1121 to 112M may include a same number of OTP cells as each row of repair OTP cells 1141 to 114N. For example, each row of main OTP cells 1121 to 112M may include 32 main OTP cells 112, and thus, can store 32 bits of data. Similarly, each row of repair OTP cells 1141 to 114N may also include 32 repair OTP cells 114. In the present embodiment, the main OTP cells 112 can be used to store system data or programs, and the repair OTP cells 114 can be used to replace invalid main OTP cells.

As shown in FIG. 1, the memory device 100 further includes a controller 120. The controller 120 can access the memory array 110, and can perform read operations and write operations to the main OTP cells 112 and the repair OTP cells 114. In some embodiments, the memory device 100 may further include some other circuits so as to assist the controller 120 to achieve the read operations or write operations although those circuits are not shown in FIG. 1 for brevity. For example, the memory device 100 may further include a row decoder and a column decoder so that the main OTP cells 112 or the repair OTP cells 114 to be read/programmed can be located by selecting the corresponding row (i.e., gate line) and the corresponding column (i.e., bit line) according to the read/write address. Also, the memory device 100 may include a driver for providing high voltages required for programming the OTP cells 112 and 114, and a sense amplifier for sensing the reading currents generated by the OTP cells 112 and 114 to be read.

Generally, in an initial state before any data is written to the memory array 110, all the main OTP cells 112 and the repair OTP cells 114 should be in an un-programmed state. For example, if the main OTP cells 112 and the repair OTP cells 114 are anti-fuse type of OTP cells, then the anti-fuse elements in the main OTP cells 112 and the repair OTP cells 114 should have high impedance before being programmed, and thus, the main OTP cells 112 and the repair OTP cells 114 should all be read as having a storage state of a first type of bit, e.g. bit "0". However, anti-fuse elements in some of OTP cells may have defects, and those defects may cause low impedance paths. In such case, those defective OTP cells may be read as having a storage state of a second type of bit, e.g., bit "1". In such case, those defective OTP cells will be seen as invalid since they cannot be used to store the desired data normally. In the present embodiment, the first type of bit can be referred to bit "0", and the second type of bit can be referred to bit "1", however, the present disclosure is not limited thereto. In some other embodiments, the first type of bit may be referred to bit "1" while the second type of bit may be referred to bit "0", depending on the system requirements.

In the present embodiment, to improve the yield rate of the memory device 100, if a main OTP cell 112 is determined to be invalid, the whole row of main OTP cells that include the invalid main OTP cell 112 can be replaced by a row of repair OTP cells. For example, if a main OTP cell 112 in the row of main OTP cells 1121 is determined to be invalid, then a row of repair OTP cells, for example, 1141, may be used to replace the row of main OTP cells 1121. In such case, when the address of the row of main OTP cells 1121 is to be accessed by a read command or a write command, the row of repair OTP 1141, instead of the row of main OTP cells 1121, will be read or written. As a result, the memory device 100 can still function normally.

However, defects may also be occurs to repair OTP cells 114. For example, one of the repair OTP cells 114 in the row of repair OTP cells 1142 is invalid as shown in FIG. 1. In such case, if the row of main OTP cells 1121 is replaced by the row of repair OTP cells 1142 that also includes defective cells, then the repairing operation will be meaningless, and the memory device 100 will still be seen as a failed product.

To address such issue, the controller 120 can perform a testing procedure to determine validities of the N rows of repair OTP cells 1141 to 114N before performing the repairing procedure to replace rows of main OTP cells that include invalid main OTP cell(s). In such case, rows of repair OTP cells that include invalid repair OTP cells will not be used in the repairing procedure. Therefore, the initial failure rate can be reduced, and the yield rate of the memory device 100 can be improved.

Figure 2:
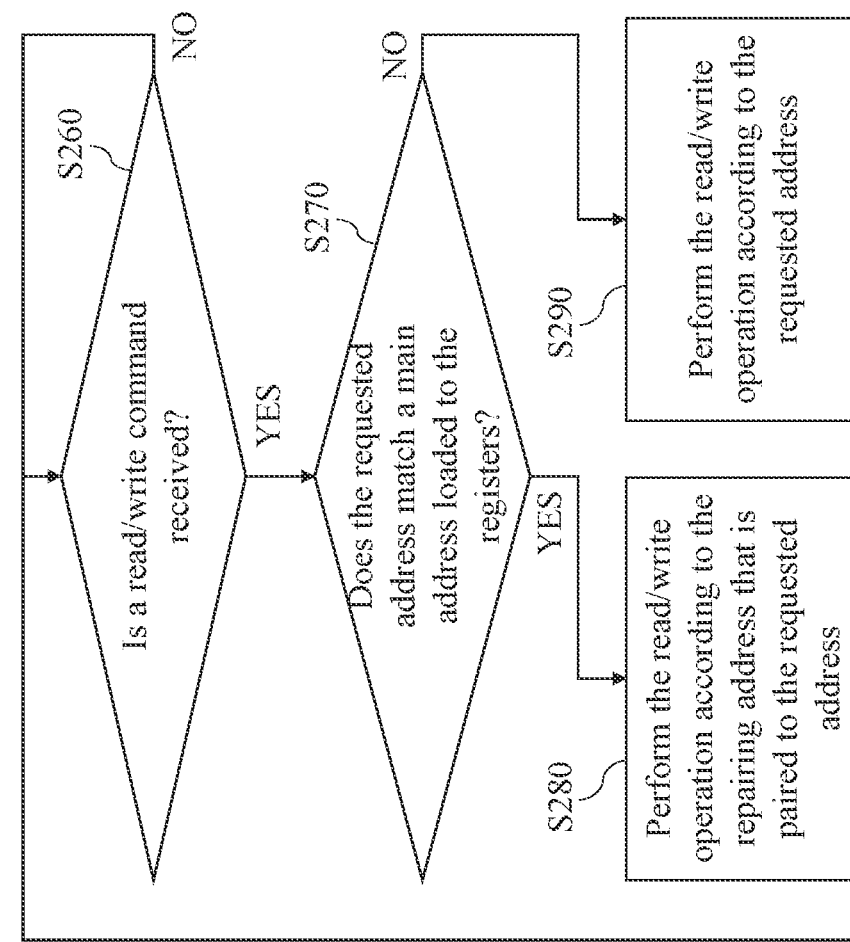
FIG. 2 shows a flow chart of a method for operating the memory device in FIG. 1 according to one embodiment of the present disclosure.
Figure 2:
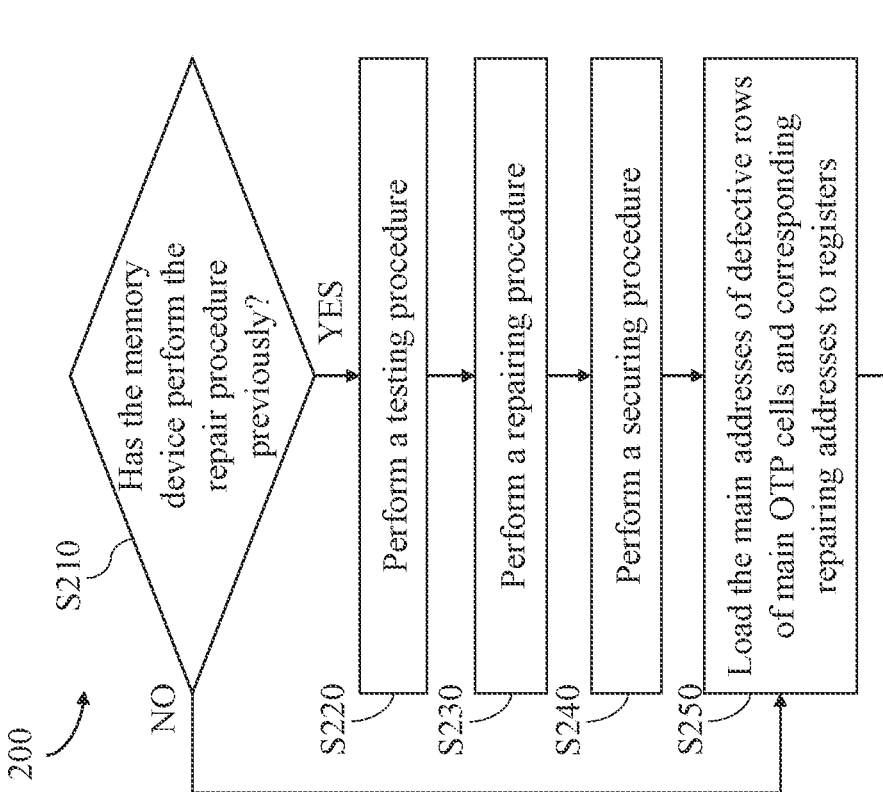

FIG. 2 shows a flow chart of a method 200 for operating the memory device 100 according to one embodiment of the present disclosure. As shown in FIG. 2, the method 200 includes steps S210 to S290.

In some embodiments, the controller 120 can be used to perform the method 200. For example, when the memory device 100 is powered on, the controller 120 can perform step S210 to check if the repairing procedure has been performed previously. If the repairing procedure has not been performed, the controller 120 would perform the testing procedure in step S220 to determine the validities of the N rows of repair OTP cells 1141 to 114N first.

In some embodiments, the controller 120 can read the data from the N rows of repair OTP cells 1141 to 114N in a manner of row by row. In an ideal case, the N rows of repair OTP cells 1141 to 114N are not programmed initially, and thus, all the repair OTP cells 114 should have the storage state of bit "0". In such case, if a repair OTP cell 114 has a storage state of bit "1", then such repair OTP cell 114 would be deemed as an invalid OTP cell, and the row in which the invalid repair OTP cell 114 resides will be determined to be invalid by the controller 120.

Figure 3:
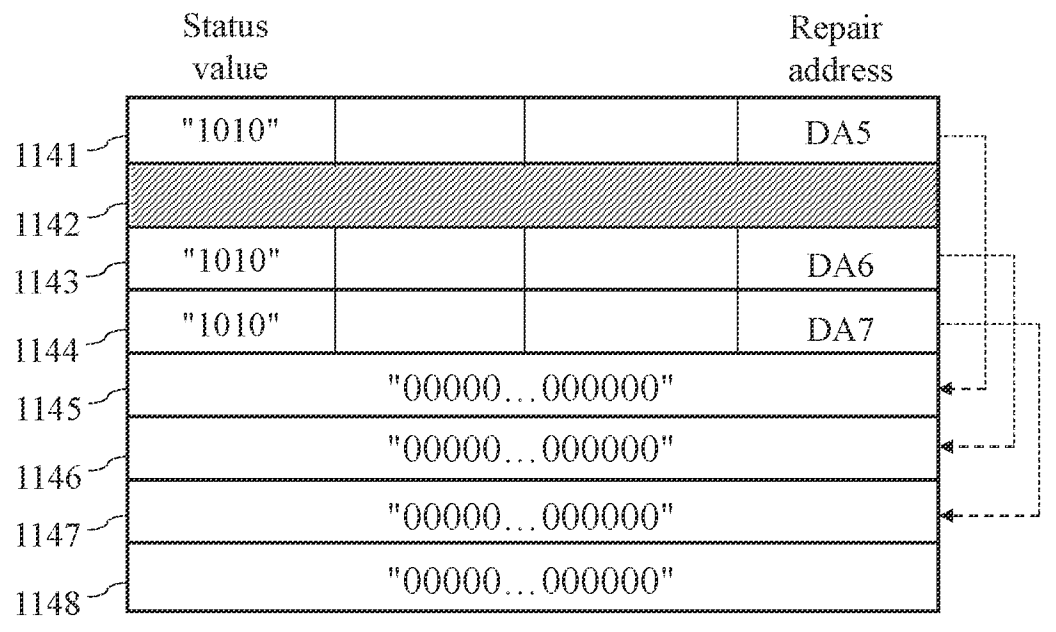

After determining the validities of the rows of repair OTP cells 1141 to 114N, the controller 120 can divide the rows of repair OTP cells that are determined to be valid into two parts. FIG. 3 shows 8 rows of repair OTP cells 1141 to 1148 after the testing procedure is performed according to one embodiment of the present disclosure. That is, in the embodiment shown in FIG. 3, N is equal to 8.

As shown in FIG. 3, there are 7 rows of repair OTP cells 1141, 1143, 1144, 1145, 1146, 1147, and 1148 are determined to be valid while the row of repair OTP cells 1142 is determined to be invalid. In such case, the 7 rows of repair OTP cells 1141, 1143, 1144, 1145, 1146, 1147, and 1148 can be divided into two different parts: one first part for storing repair information, and one second part for replacing the invalid rows of main OTP cells.

In some embodiments, the repair information may include a repair address which represents the address of the row of repair OTP cells that is available to replace the invalid row of main OTP cells. For example, as shown in FIG. 3, rows of repair OTP cells 1141, 1143, and 1144 can be defined as in the first part, and rows of repair OTP cells 1145, 1146, and 1147 can be defined as in the second part. In some embodiments, each of the rows of repair OTP cells 1141, 1143, and 1144 in the first part can be divided into multiple columns for storing a variety of different repair information. For example, the controller 120 can store the repair addresses DA5, DA6, and DA7 of the rows of repair OTP cells 1145, 1146, and 1147 (in the second part) to the rows of repair OTP cells 1141, 1143, and 1144 (in the first part) respectively during the testing procedure.

In some embodiments, the repair addresses DA5, DA6, and DA7 can be represented by 6 bits, however, the present disclosure is not limited thereto. In some embodiments, the bit length of the repair addresses DA5, DA6, and DA7 may be decided according to the row number N of the rows of repair OTP cells 1141 to 114N.

In addition, in the present embodiment, to define the first part of the valid rows of repair OTP cells 1141, 1143, and 1144 and indicate the availabilities of the valid rows of repair OTP cells 1145, 1146, and 1147, the controller 120 may further store the repair information including a predetermined status value to the rows of repair OTP cells 1141, 1143, and 1144. For example, as shown in FIG. 3, the valid rows of repair OTP cells 1141, 1143, and 1144 may store a four-bit status value "1010", so as to indicate the availabilities. However, the present disclosure is not limited thereto. In some other embodiments, the status value for indicating the availability can be other value, and can be represented by more bits or less bits according to the system requirement.

In the present embodiment, since each row of repair OTP cells in the first part can only store one repair address of another row of repair OTP cells in the second part, the number of rows of repair OTP cells defined in the first part should be equal to the number of rows of repair OTP cells defined in the second part. In such case, since the total number of valid rows of repair OTP cells (1141, 1143, 1144, 1145, 1146, 1147, and 1148) is 7, which is an odd number, one valid row of repair OTP cells, for example, the row of repair OTP cells 1148, will not be used. That is, in some embodiments, if the total number of valid rows of repair OTP cells is K, then the controller 120 may assign J rows of repair OTP cells to the first part for storing repair information, and assign another J rows of repair OTP cells to the second part for replacing invalid rows of main OTP cells, where K is an integer greater than 1 but not greater than N, and J is a maximum integer that is smaller than or equal to half of K.

In some embodiments, if there is only one row of repair OTP cells in the N rows of repair OTP cells 1141 to 114N determined to be valid, the only one valid row of repair OTP cell will still not be used to replace any invalid row of main OTP cells. In some embodiments, to indicate such repairing failure situation, the controller 120 may store a corresponding status value, e.g. "1111", which is different from the status value "1010" that implies an availability as shown in FIG. 3, to the only one valid row of repair OTP cells.

After the testing procedure, the controller 120 can further perform the repairing procedure in step S230. During the repairing procedure, the controller 120 can determine validities of the M rows of main OTP cells 1121 to 112M. Similarly, the controller 120 can read the data from the M rows of main OTP cells 1121 to 112M. In an ideal case, the M rows of main OTP cells 1121 to 112N are not programmed initially, and thus, if main OTP cells 112 in a same row all have the storage state of bit "0", then such row of main OTP cells would be determined to be valid. However, if a main OTP cell 112 has a storage state of bit "1", then the row in which the invalid main OTP cell 112 resides will be determined to be invalid by the controller 120.

After determining the validities of the M rows of main OTP cells 1121 to 112M, the controller 120 can further repair the invalid rows of main OTP cells by using valid rows of repair OTP cells during the repairing procedure in step S230.

Figure 4:
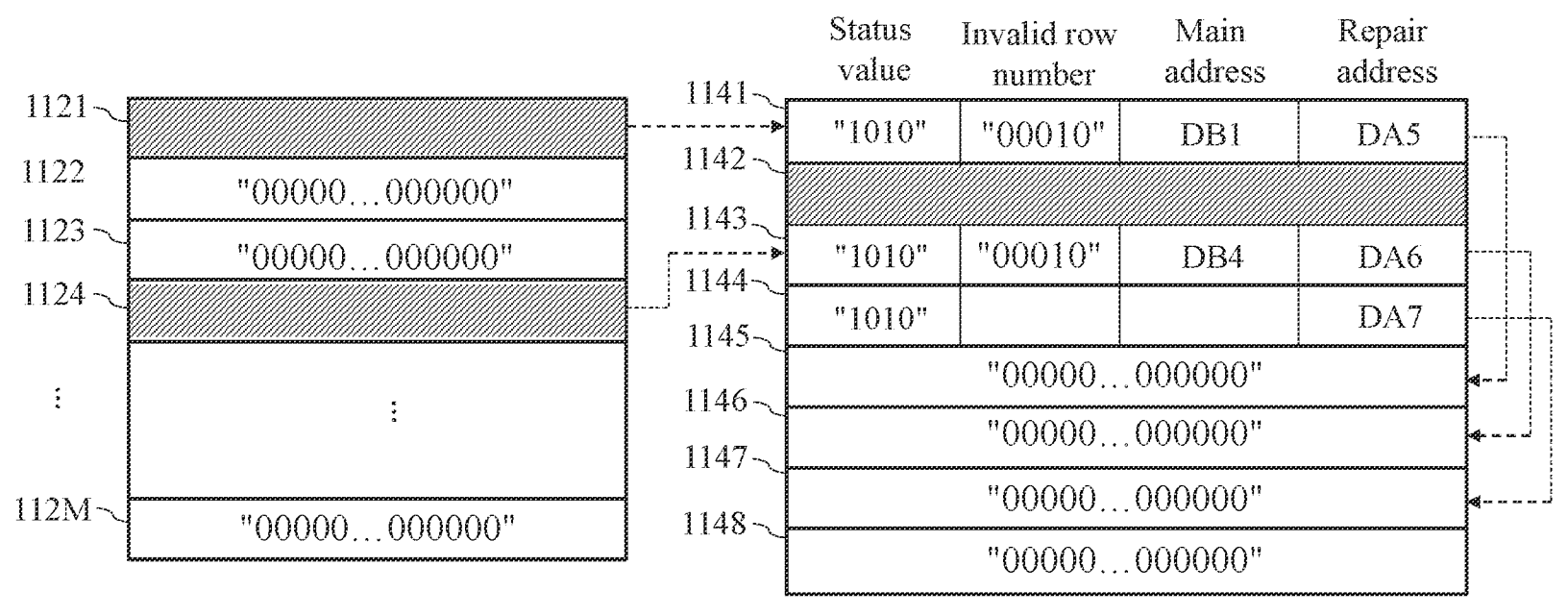

FIG. 4 shows M rows of main OTP cells 1121 to 112M and 8 rows of repair OTP cells 1141 to 1148 after the repairing procedure is performed according to one embodiment of the present disclosure. As shown in FIG. 4, the rows of main OTP cells 1121 and 1124 are determined to be invalid. In such case, the controller 120 may store the main addresses DB1 and DB4 of the rows of main OTP cells 1121 and 1124 to the rows of repair OTP cells 1141 and 1143. In such case, the row of repair OTP cells 1141 can store the repair information including the main address DB1 and the repair address DA5, which implies that the main address DB1 is paired with the repair address DA5. As a result, the row of main OTP cells 1121 corresponding to the main address DB1 will be replaced by the row of repair OTP cells 1145 corresponding to the repair address DA5. Similarly, the row of main OTP cells 1124 corresponding to the main address DB4 will be replaced by the row of repair OTP cells 1146 corresponding to the repair address DA6 according to the repair information stored in the row of repair OTP cells 1143.

Since the repairing procedure is performed after the testing procedure, the rows of repair OTP cells that used for replacing the failed rows of main OTP cells can be checked and determined to be valid in advance, therefore, the possibility that an invalid row of main OTP cells is happened to be repaired by another invalid row of repair OTP cells can be reduced, and thus, the yield rate of the memory device 100 can be improved.

After the repairing procedure, the controller 120 may further perform a securing procedure in step S240 to protect the invalid OTP cells from being used unintentionally or maliciously. For example, the controller 120 may program all rows of repair OTP cells that are determined to be invalid and all rows of main OTP cells that are determined to be invalid. That is, after the securing procedure, all the repair OTP cells 114 in the invalid rows and all the main OTP cells 112 in the invalid rows will have the storage state of bit "1".

Figure 5:
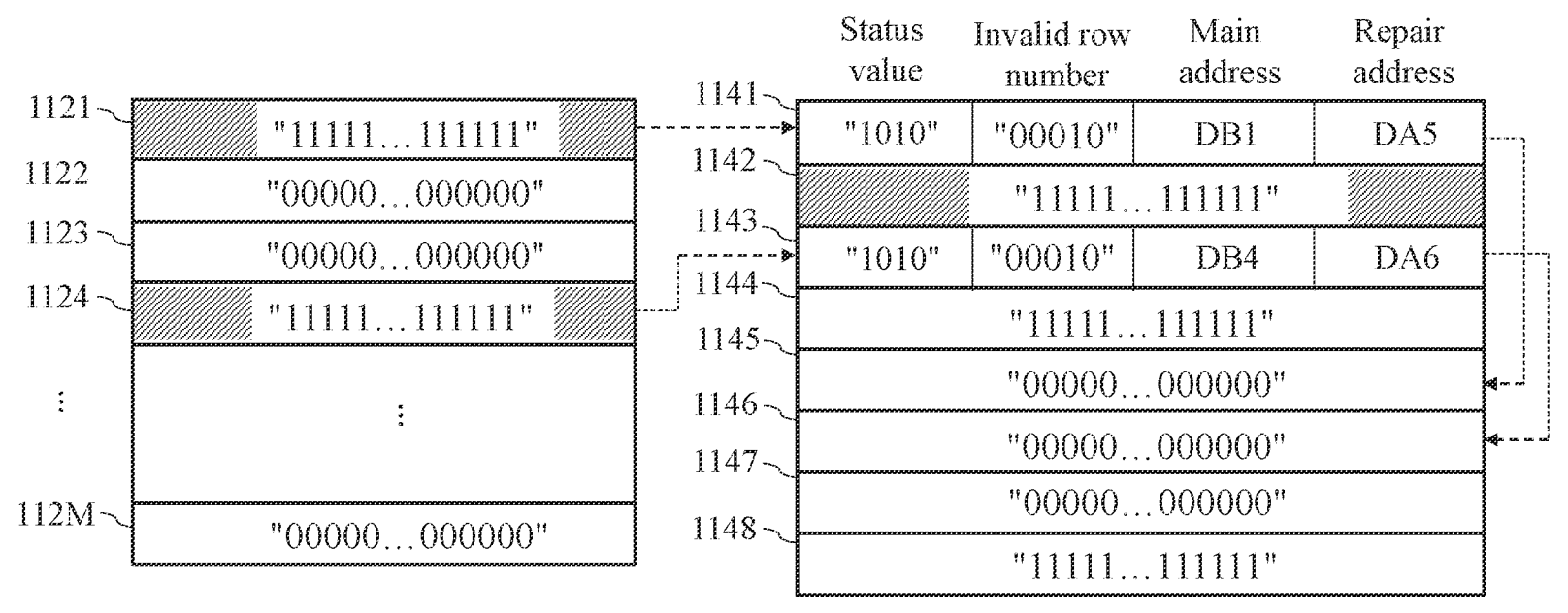

FIG. 5 shows M rows of main OTP cells 1121 to 112M and 8 rows of repair OTP cells 1141 to 1148 after the securing procedure is performed according to one embodiment of the present disclosure. As shown in FIG. 5, the repair OTP cells 114 in the row of repair OTP cells 1142 that has been determined to be invalid in the testing procedure is programmed to have the storage state of bit "1". Also, the main OTP cells 112 in the rows of main OTP cells 1121 and 1124 that have been determined to be invalid in the repairing procedure are programmed to have the storage state of bit "1".

In addition, although the row of repair OTP cells 1148 has been determined to be valid in the testing procedure, the row of repair OTP cells 1148 is left unused, and thus, the controller 120 can also program all the repair OTP cells 114 in the row of repair OTP cells 1148 to have the storage state of bit "1" as shown in FIG. 5.

Furthermore, in the present embodiment, since there are only two rows of main OTP cells 1121 and 1124 needs to be repaired while there are three rows of repair OTP cells 1145, 1146, and 1147 are available for repairing, the row of repair OTP cells 1147 is left unused. That is, no main address is stored to the row of repair OTP cells 1147 after the repairing procedure. In such case, the controller 120 can also program all the repair OTP cells 114 in the row of repair OTP cells 1147 to have the storage state of bit "1". In addition, the controller 120 can further program the repair OTP cells 114 in the row of repair OTP cells 1144 used to store the repair information of the row of repair OTP cells 1147 to have the storage state of bit "1".

By performing the securing procedure, OTP cells that are invalid or unused can be programmed so as to protect the unused memory spaces from being used unintentionally or maliciously. However, the present disclosure is not limited thereto. In some embodiments, the securing procedure may be omitted according to the designer's need.

After the repairing procedure is performed, the controller 120 can load the repair information stored in the first part of the valid rows of the repair OTP cells 1141 and 1143 to registers 130 of the memory device 100 in step S250. Therefore, when the memory device 100 receives a read/write command in step S260, and the requested address matches the main address loaded to the registers 130 in step S270, it would be noted that such main address is invalid. In such case, the controller 120 will perform step S280. That is, the read/write operation will be performed according to the repair address loaded to the registers 130 that is paired to the requested address of the read/write command. Otherwise, the controller 120 will perform the read/write operation according to the requested address of the read/write command in step S290.

For example, the repair information stored in first part of valid rows of repair OTP cells 1141 and 1143 (shown in FIGS. 4-6) can be loaded to the registers 130. In such case, when a read command is received and a read address of the read command is identical to the main address DB1 loaded to the registers 130, the controller 120 would read data stored in the row of repair OTP cells 1145 according to the repair address DA5 that is paired to the main address DB1. Similarly, when a write command is received and a write address of the write command is identical to the main address DB4 loaded to the registers 130, the controller 120 would write data to the row of repair OTP cells 1146 according to the repair address DA6 that is paired to the main address DB4.

As a result, although some of the rows of main OTP cells 1121 to 112M may be invalid, some of the rows of the repair OTP cells 1141 to 114N may be valid and can be used to replace the invalid rows of main OTP cells. Therefore, the memory array 110 of the memory device 100 can still be accessed normally, and the memory device 100 can still be sold as a well-functioned product.

However, if the number of invalid rows of main OTP cells is greater than the number of the valid rows of repair OTP cells that is available for replacing the invalid rows of main OTP cells, then the repairing procedure may still fail, which is referred to an overflow failure.

In the present embodiment, to report such overflow failure, the controller 120 may count an available row number of the rows of repair OTP cells in the first part or the second part of the rows of repair OTP cells that are determined to be valid during the testing procedure. Also, during the repairing procedure, the controller 120 can count an invalid row number of rows of main OTP cells that are determined to be invalid in the rows of main OTP cells 1121 to 112M. Afterward, the controller 120 can compare the available row number and the invalid row number, if the invalid row number is smaller than or equal to the available row number, it would imply that there are enough of rows of repair OTP cells that can be used for repairing the invalid rows of main OTP cells. Therefore, the controller 120 would store the main addresses of the rows of main OTP cells that are determined to be invalid to corresponding rows of repair OTP cells in the first part of the valid rows of repair OTP cells. As a result, the repairing procedure can be completed successfully.

For example, as shown in FIG. 3, there are three rows of repair OTP cells 1145, 1146, and 1147 that are assigned to the second part, so the available row number would be 3. Also, as shown in FIG. 4, there are two rows of main OTP cells 1121 and 1124 are determined to be invalid, so the invalid row number would be 2. In such case, the invalid row number (i.e., 2) is smaller than the available row number (i.e., 3); therefore, the controller 120 can store the main addresses of the rows of main OTP cells 1121 and 1124 that are determined to be invalid to the rows of repair OTP cells 1141 and 1143 respectively.

In some embodiments, the controller 120 may further store the repair information including the invalid row number to the corresponding rows of repair OTP cells where the main address to be repaired is stored. For example, as shown in FIG. 4, the rows of repair OTP cells 1141 and 1143 may further store the invalid row number 2 represented by six bits "00010".

However, if the invalid row number is greater than the available row number, there would be no enough of rows of repair OTP cells for repairing the invalid rows of main OTP cells. In such case, the controller 120 would report the overflow failure. In some embodiments, to record the overflow failure, the controller 120 may store a predetermined number as the invalid row number in the rows of repair OTP cells in the first part.

Figure 6:
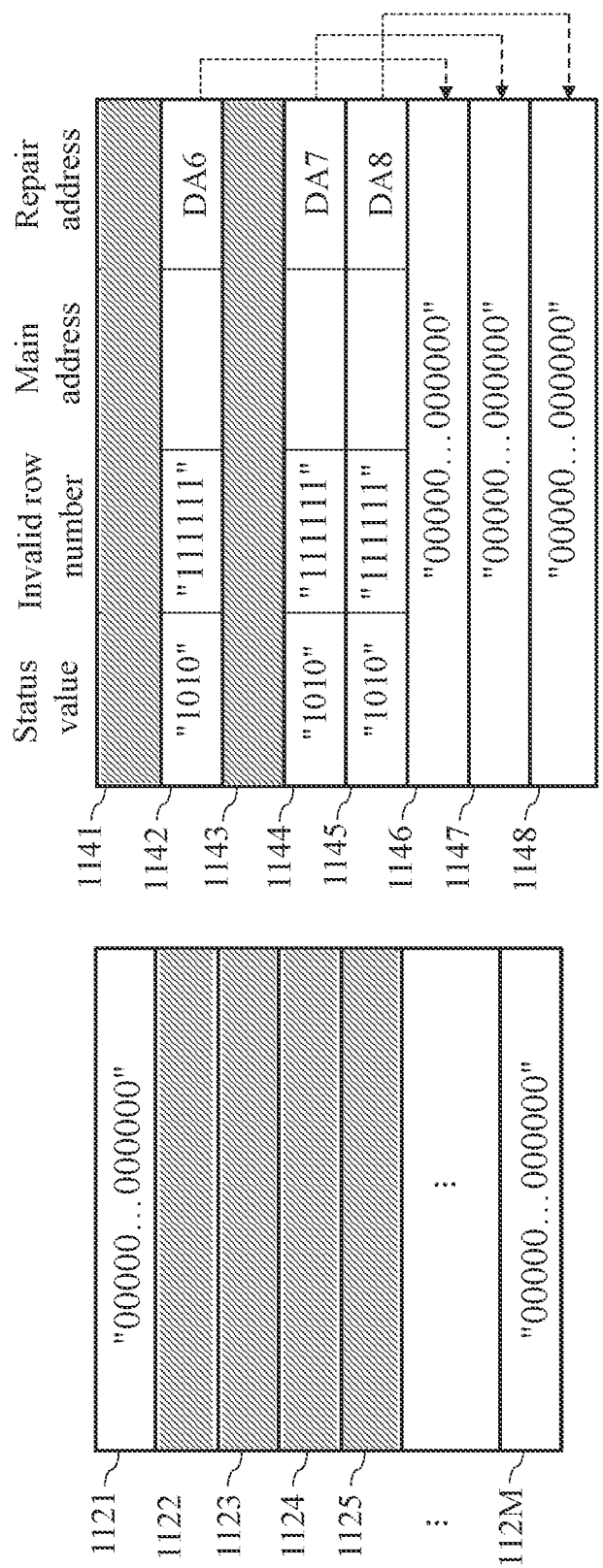
FIG. 6 shows rows of main OTP cells and rows of repair OTP cells after the repairing procedure is performed according to one embodiment of the present disclosure.

FIG. 6 shows M rows of main OTP cells 1121 to 112M and 8 rows of repair OTP cells 1141 to 1148 after the repairing procedure is performed according to one embodiment of the present disclosure. As shown in FIG. 6, there are six rows of repair OTP cells 1142, 1144, 1145, 1146, 1147, and 1148 determined to be valid. In such case, the controller 120 may assign the rows of repair OTP cells 1142, 1144, 1145 to the first part for storing the repair information, and assign the rows of repair OTP cells 1146, 1147, 1148 to the second part for replacing the invalid rows of main OTP cells. However, since there are four rows of main OTP cells 1122, 1123, 1124, and 1125 that are determined to be invalid, there is no enough of rows of repair OTP cells in the second part to replace the four invalid rows of main OTP cells 1122, 1123, 1124, and 1125. As a result, the controller 120 may store the predetermined number "111111" as the invalid row number to the rows of repair OTP cells 1142, 1144, and 1145, thereby indicating the overflow failure. In the present embodiments, the predetermined number is represented by 6 bits, and can be greater than the total number M of the rows of main OTP cells 1121 to 112M so as to differentiate such predetermined number "111111" from the invalid row numbers appear in the normal situation.

In addition, to prevent the unused rows of repair OTP cells 1146, 1147, and 1148 from being used intentionally or maliciously, the controller 120 may further program all repair OTP cells in the rows of repair OTP cells 1146, 1147, and 1148 to have the storage state of bit "1".

By comparing the available row number of the rows of repair OTP cells that can be used for repairing to the invalid row number of the rows of main OTP cells that needs to be repair, the memory device 100 can report the overflow failure in an early stage, thereby preventing invalid main OTP cells from being replaced by invalid repair OTP cells and reducing the failure found at the user side.

In summary, the memory device and the method for operating the memory device provided by the embodiments of the present disclosure can perform the testing procedure to check the validities of the repair OTP cells before the repairing procedure, so that the invalid rows of main OTP cells can only be replaced by rows of repair OTP cells that have been determined to be valid. As a result, the initial failure rate can be reduced and the yield rate can be improved.

What is claimed is:

1. A method for operating a memory device, the memory device comprising a memory array, the memory array comprising a plurality of rows of repair one-time programmable (OTP) cells and a plurality of rows of main OTP cells, and the method comprising:
   performing a testing procedure to determine validities of the plurality of rows of repair OTP cells and store repair information to a first part of rows of repair OTP cells that are determined to be valid; and
   performing a repairing procedure to determine validities of the plurality of rows of main OTP cells and repair at least one row of main OTP cells that is determined to be invalid in the plurality of rows of main OTP by using a second part of the rows of repair OTP cells that are determined to be valid.

2. The method of claim 1, wherein the step of performing the testing procedure comprises:
   assigning a first row of repair OTP cells to the first part of the rows of repair OTP cells that are determined to be valid;

assigning a second row of repair OTP cells to the second part of the rows of repair OTP cells that are determined to be valid; and storing the repair information comprising a repair address of the second row of repair OTP cells to the first row of repair OTP cells.

3. The method of claim 2, wherein the step of performing the repairing procedure comprises:

if a first row of main OTP cells in the plurality of rows of main OTP cells is determined to be invalid, storing the repair information comprising a main address of the first row of main OTP cells to the first row of repair OTP cells, thereby pairing the main address to the repair address.

4. The method of claim 3, further comprising:

after the repairing procedure, loading the main address and the repair address from the first row of repair OTP cells to a plurality of registers.

5. The method of claim 4, further comprising:

when a read command is received and a read address of the read command is identical to the main address loaded to the plurality of registers, reading data stored in the second row of repair OTP cells according to the repair address loaded to the plurality of registers.

6. The method of claim 4, further comprising:

when a write command is received and a write address of the write command is identical to the main address loaded to the plurality of registers, writing data to the second row of repair OTP cells according to the repair address loaded to the plurality of registers.

7. The method of claim 2, further comprising:

after the repairing procedure is performed, if no main address is stored to the first row of repair OTP cells, programming all cells in the first row of repair OTP cells and the second row of repair OTP cells.

8. The method of claim 2, wherein the step of performing the testing procedure further comprises:

storing the repair information comprising a first status value to the first row of repair OTP cells for indicating an availability of the second row of repair OTP cells.

9. The method of claim 1, wherein the step of performing the testing procedure comprises:

if only one row of repair OTP cells in the plurality of rows of repair OTP cells is determined to be valid, storing the repair information comprising a second status value to the only one row of repair OTP cells for indicating a repairing failure.

10. The method of claim 1, further comprising:

after the testing procedure is performed, programming all rows of repair OTP cells that are determined to be invalid in the plurality of rows of repair OTP cells; and programming all rows of main OTP cells that are determined to be invalid in the plurality of rows of main OTP cells.

11. The method of claim 1, wherein:

the step of performing the testing procedure comprises:

counting an available row number in the first part or the second part of the rows of repair OTP cells that are determined to be valid;

the step of performing the repairing procedure comprises:

counting an invalid row number of rows of main OTP cells that are determined to be invalid; and if the invalid row number is smaller than or equal to the available row number:

storing the repair information comprising main addresses of the rows of main OTP cells that are determined to be invalid to corresponding rows of repair OTP cells in the first part of the rows of repair OTP cells that are determined to be valid.

12. The method of claim 1, wherein:

the step of performing the testing procedure comprise:

counting an available row number of the rows of repair OTP cells in the second part of the rows of repair OTP cells that are determined to be valid;

the step of performing the repairing procedure further comprises:

counting an invalid row number of rows of main OTP cells that are determined to be invalid; and if the invalid row number is greater than the available row number, reporting an overflow failure.

13. The method of claim 1, wherein the step of performing the testing procedure comprises:

reading each of the plurality of rows of repair OTP cells; and determining validity of each of the plurality of rows of repair OTP cells according to storage state of each of the plurality of rows of repair OTP cells.

14. A memory device, comprising:

a memory array, comprising:

a plurality of rows of main OTP cells, configured to store data;

a plurality of rows of repair one-time programmable (OTP) cells; and a controller, configured to:

perform a testing procedure to determine validities of the plurality of rows of repair OTP cells and store repair information to a first part of rows of repair OTP cells that are determined to be valid; and perform a repairing procedure to determine validities of the plurality of rows of repair OTP cells and repair at least one row of main OTP cells that is determined to be invalid in the plurality of rows of main OTP by using a second part of the rows of repair OTP cells that are determined to be valid.

15. The memory device of claim 14, wherein:

the controller determines a first row of repair OTP cells and a second row of repair OTP cells in the plurality of rows of repair OTP cells to be valid, assigns the first row of repair OTP cell to the first part of the rows of repair OTP cells that are determined to be valid, and assigns the second row of repair OTP cell to the second part of the rows of repair OTP cells that are determined to be valid; and the first row of repair OTP cells is configured to store the repair information comprising a repair address of the second row of repair OTP cells in the first row of repair OTP cells.

16. The memory device of claim 15, wherein:

the controller determines a first row of main OTP cells in the plurality of rows of main OTP cells to be invalid; and the first row of repair OTP cells is further configured to store the repair information comprising a main address of the first row of main OTP cells, so that the main address is paired to the repair address.

17. The memory device of claim 16, further comprising a plurality of registers configured to load the main address and the repair address from the first row of repair OTP cells after the repairing procedure.

18. The memory device of claim 15, wherein the first row of repair OTP cells is further configured to store the repair information comprising a first status value for indicating an availability of the second row of repair OTP cells.

19. The memory device of claim 14, wherein:
if only one row of repair OTP cells in the plurality of rows of repair OTP cells is determined to be valid, the only one row of repair OTP cells is configured to store the repair information comprising a second status value for indicating a repairing failure.

20. The memory device of claim 14, wherein:
during the testing procedure, the controller counts an available row number of the rows of repair OTP cells in the first part or the second part of the rows of repair OTP cells that are determined to be valid;
during the repairing procedure, the controller counts an invalid row number of rows of main OTP cells that are determined to be invalid; and
if the invalid row number is greater than the available row number, the controller is further configured to report an overflow failure.

* * * * *